US011112340B2

(12) United States Patent
Huber et al.

(10) Patent No.: US 11,112,340 B2
(45) Date of Patent: Sep. 7, 2021

(54) GAS ANALYZER AND GAS ANALYZING DEVICE

(71) Applicants: ENDRESS+HAUSER FLOWTEC AG, Reinach (CH); TRUEDYNE SENSORS AG, Reinach (CH)

(72) Inventors: Christof Huber, Bern (CH); Patrick Reith, Putzbrunn (DE); Anastasios Badarlis, Birsfelden (CH)

(73) Assignee: Endress+Hauser Flowtec AG, Reinach (CH)

( * ) Notice: Subject to any disclaimer, the term of this patent is extended or adjusted under 35 U.S.C. 154(b) by 147 days.

(21) Appl. No.: 16/471,162

(22) PCT Filed: Nov. 22, 2017

(86) PCT No.: PCT/EP2017/080052
§ 371 (c)(1),
(2) Date: Jun. 19, 2019

(87) PCT Pub. No.: WO2018/114187
PCT Pub. Date: Jun. 28, 2018

(65) Prior Publication Data
US 2019/0317037 A1  Oct. 17, 2019

(30) Foreign Application Priority Data
Dec. 20, 2016  (DE) .................... 10 2016 124 910.6

(51) Int. Cl.
*G01N 9/00*  (2006.01)
*G01N 11/16*  (2006.01)
(Continued)

(52) U.S. Cl.
CPC ............. *G01N 9/002* (2013.01); *G01N 11/16* (2013.01); *G01N 29/022* (2013.01); *G01N 27/18* (2013.01);
(Continued)

(58) Field of Classification Search
CPC ........ G01N 27/18; G01N 9/002; G01N 11/16; G01N 29/022; G01N 2291/021;
(Continued)

(56) References Cited

U.S. PATENT DOCUMENTS

2002/0092340 A1* 7/2002 Prater .................. G02B 7/1821
73/24.02
2005/0121615 A1 6/2005 Prater et al.

FOREIGN PATENT DOCUMENTS

CN  101346616 A  1/2009
CN  102288516 B1  12/2011
(Continued)

*Primary Examiner* — Benjamin R Schmitt
(74) *Attorney, Agent, or Firm* — Mark A. Logan; Endress+Hauser (USA) Holding Inc.

(57) ABSTRACT

The present disclosure relates to a gas analyzer for measuring density and/or viscosity of a medium. The gas analyzer includes a connection panel having first and second media openings, each of which extends from a first surface to a second surface of the connection panel. A sensor panel is joined together with the connection panel on a first joint plane, and a cover panel is joined together with the sensor panel on a second joint plane, on a sensor panel face facing away from the connection panel. The cover panel has a cover panel cavity which communicates with the first and second media openings, and the sensor panel has at least one oscillator cavity which communicates with the first and second media openings. The sensor panel has a micromechanical oscillator arranged in the oscillator cavity and excitable to mechanically vibrate perpendicularly to the joint planes.

12 Claims, 3 Drawing Sheets

(51) Int. Cl.
*G01N 29/02* (2006.01)
*G01N 27/18* (2006.01)

(52) U.S. Cl.
CPC ................. *G01N 2291/021* (2013.01); *G01N 2291/02818* (2013.01); *G01N 2291/0427* (2013.01)

(58) Field of Classification Search
CPC . G01N 2291/02818; G01N 2291/0427; G01N 29/2431; G01N 29/036; G01N 29/222
See application file for complete search history.

(56) References Cited

FOREIGN PATENT DOCUMENTS

| | | | |
|---|---|---|---|
| CN | 102353609 A | 2/2012 | |
| CN | 102735587 A | 10/2012 | |
| CN | 104303052 A | 1/2015 | |
| CN | 105765352 A | 7/2016 | |
| DE | 102014115566 A1 | 5/2015 | |
| DE | 102014106729 A1 * | 11/2015 | ............. G01F 1/692 |
| DE | 102014106729 A1 | 11/2015 | |
| DE | 102015117468 A1 | 4/2017 | |

* cited by examiner

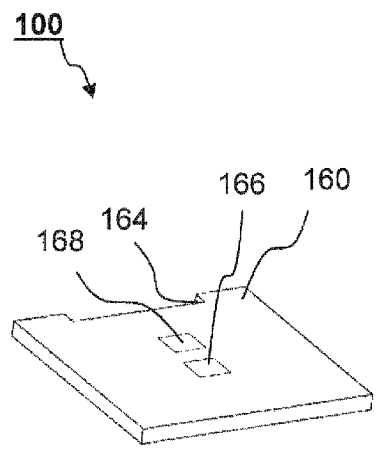
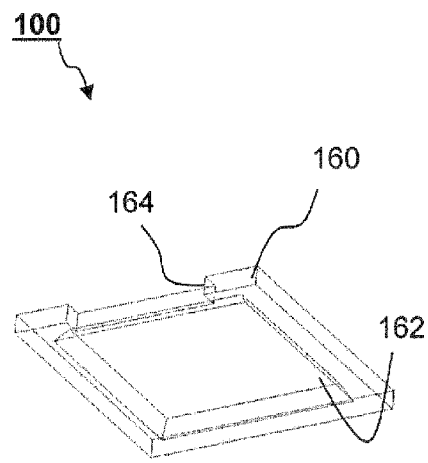
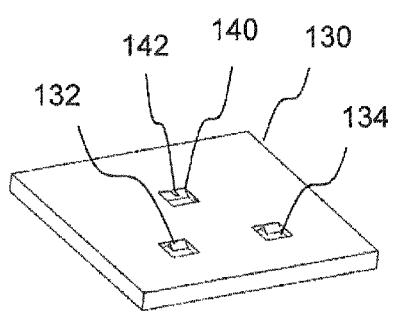
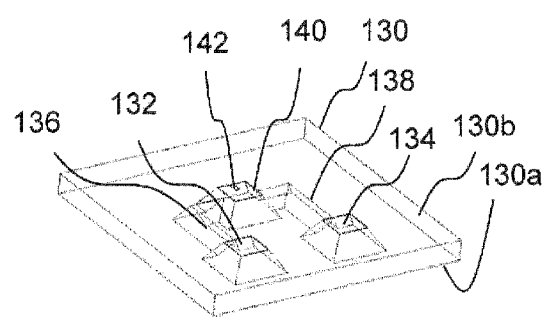
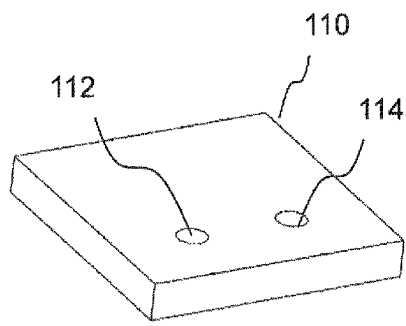
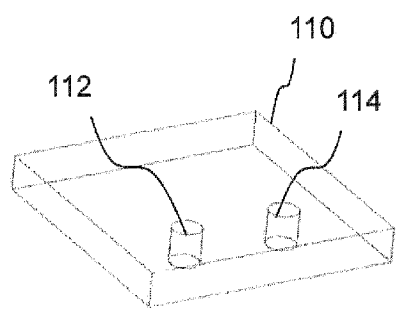
Fig. 1a
Fig. 1b

GAS ANALYZER AND GAS ANALYZING DEVICE

CROSS-REFERENCE TO RELATED APPLICATIONS

The present application is related to and claims the priority benefit of German Patent Application No. 10 2016 124 910.6, filed on Dec. 20, 2016 and International Patent Application No. PCT/EP2017/080052 filed on Nov. 22, 2017, the entire contents of which are incorporated herein by reference.

TECHNICAL FIELD

The present invention relates to a gas analyzer, in particular a gas analyzer with a vibronic sensor element, for determining the sum parameters of a gas mixture, such as calorific value or Wobbe index, for example of a natural gas, which usually contains additional hydrocarbons, nitrogen, carbon dioxide, and water vapor in addition to the main component of methane. In addition, hydrogen is frequently admixed with the natural gas.

BACKGROUND

The knowledge of the exact composition is of great importance for the control of a burner, for example. Methods for determining the properties of a fuel gas are, for example, described in the as of yet unpublished patent applications DE 10 2015 117 486, DE 10 2016 121 226. The determination of the gas properties as described therein is based in particular on a measurement of the density and the viscosity of the gas mixture by means of a vibronic sensor. For this purpose, there is a need for a gas analyzer that can provide reliable measurements and can be manufactured cost-effectively. It is the object of the present invention to provide such an analyzer and a gas analyzing device having such an analyzer.

SUMMARY

In accordance with the invention, the object is achieved by the gas analyzer and by the and gas analyzing device according of the present disclosure.

The gas analyzer according to the invention for measuring the density and/or viscosity of a medium, in particular of a gas mixture, comprises:

a connection panel that has a first media opening and a second media opening, each of which extends from a first surface to a second surface of the connection panel;

a sensor panel which is joined together with the connection panel on a first joint plane; and a cover panel which is joined together with the sensor panel on a second joint plane on a sensor panel face facing away from the connection panel, wherein the cover panel has a cover panel cavity which communicates with the first and second media openings;

wherein the sensor panel has at least one oscillator cavity which communicates with the first media opening and the second media opening, wherein the sensor panel has a micromechanical oscillator which is arranged in the oscillator cavity and can be excited so as to mechanically vibrate perpendicularly to the joint planes.

In a development of the invention, the oscillator cavity comprises a first aperture through the sensor panel.

In a development of the invention, the gas analyzer furthermore comprises a first fluid channel which extends from the first media opening to the oscillator cavity and is formed between the connection panel and the sensor panel, and/or a second fluid channel which extends from the second media opening to the oscillator cavity and is formed between the connection panel and the sensor panel.

In a development of the invention, the sensor panel has a first media opening aperture extending from the first media opening to the cover panel cavity, and/or the sensor panel has a second media opening aperture extending from the second media opening to the cover panel cavity.

In a development of the invention, the cover panel cavity covers both the oscillator cavity and the first media opening aperture and the second media opening aperture.

In a development of the invention, the first fluid channel has a depression formed in the surface of the sensor panel, wherein the first fluid channel opens into the first media opening aperture; and/or the second fluid channel has a depression formed in the surface of the sensor panel, wherein the second fluid channel opens into the second media opening aperture.

In a development of the invention, the first media opening aperture has a first area centroid on an upper side of the sensor panel facing toward the cover panel, wherein the second media opening aperture has a second area centroid on the upper side of the sensor panel; wherein the first area centroid has an area centroid clearance from the second area centroid; wherein the oscillator opening has a third area centroid on the upper side of the sensor panel; wherein the third area centroid has a clearance from a connecting line between the first and the second area centroids which has at least half the geometric mean, in particular at least one and preferably two times the geometric mean arising from the area centroid clearance and the clearance of the cover panel from the upper side of the sensor layer as averaged along the connecting line.

In a development of the invention, the media opening apertures, the oscillator opening, the cover panel cavity and fluid channels, if any are present, are positioned and matched to one another such that the average flow velocity of a gas in the oscillator opening is not more than one-quarter, in particular not more than one-eighth, and preferably not more than one-sixteenth of the average flow velocity in the media opening apertures.

In a development of the invention, the sensor panel comprises silicon and is prepared in particular by structuring an SOI wafer. In one embodiment of this development of the invention, the oscillator comprises amorphous silicon which is deposited on an insulator layer of the SOI wafer.

In a development of the invention, the oscillator has a resistive transducer with at least one resistive element having a resistance value that is dependent on deformation, in particular a bridge circuit with four resistive elements.

In a development of the invention, the oscillator has at least one conductor loop in order to generate a first magnetic field, wherein the gas analyzer furthermore has a field source for a second magnetic field, wherein the first magnetic field and the second magnetic field respectively have at least one component that runs parallel to the surface normal of the sensor panel.

The gas analysis arrangement according to the invention comprises the gas analyzer according to the invention, a temperature sensor, and/or a pressure sensor, and/or a thermal conductivity sensor.

In a development of the invention, the gas analysis arrangement furthermore comprises an operating and evaluation circuit for exciting the oscillator of the gas analyzer, and for detecting the vibrations of the oscillator, and, if applicable, for driving additional sensors of the gas analyzer and detecting their signals.

In a development of the invention, the cover panel comprises Si.

In a development of the invention, the connection panel comprises glass, in particular a borosilicate glass.

BRIEF DESCRIPTION OF THE DRAWING

The invention is now explained in more detail using the exemplary embodiment shown in the drawings. The following are shown:

FIG. 1a shows an exploded view of the exemplary embodiment of a gas analyzer according to the present disclosure;

FIG. 1b shows an exploded view of the exemplary embodiment from FIG. 1a, with transparent components;

DETAILED DESCRIPTION

Figure 2:
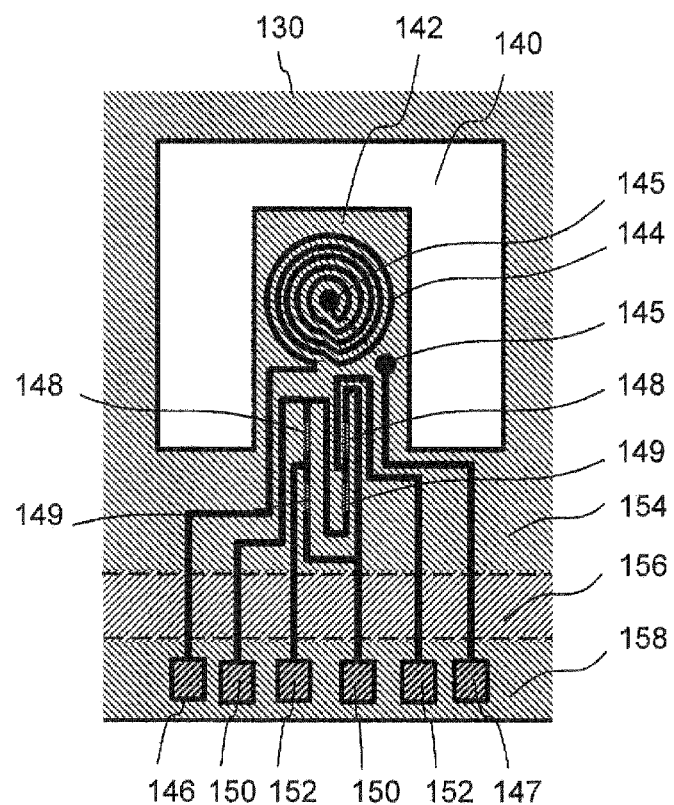
FIG. 2 shows a schematic view of the vibronic sensor of the exemplary embodiment from FIGS. 1a and 1b.

The exemplary embodiment of a gas analyzer 100 as shown in FIGS. 1a and 1b comprises a connection panel 110 made of borosilicate glass, for example Borofloat, in a material thickness of several hundred micrometers. The connection panel 110 has a first media opening 112 and a second media opening 114, each extending from a first surface to a second surface of the connection panel 110. During operation, a gas to be analyzed is fed to or discharged from the gas analyzer through the two media openings 112, 114.

The gas analyzer 100 furthermore comprises a sensor panel 130 which is joined together with the connection panel 110 on a first joint plane, for example via anodic bonding. The sensor panel 130 comprises a first media opening aperture 132 aligned with the first media opening 112 and a second media opening aperture 134 aligned with the second media opening 114. The sensor panel 110 furthermore comprises an oscillator cavity 140 in which is mounted a vibronic sensor 142 in the form of a cantilever oscillator which is prepared on an upper side 130b of the sensor panel 130 facing away from the connection panel. The sensor panel 130 is preferably made of an Sal wafer, wherein the cantilever oscillator is prepared in what is known as the device layer.

Furthermore, the gas analyzer 100 comprises a cover panel 160 which is joined, for example with a glass solder, together with the sensor panel on a second joint plane on a sensor panel 130 face facing away from the connection panel 110. A cover panel cavity 162 facing toward the sensor panel 130 is prepared in the cover panel 160, which cover panel cavity 162 extends over both media opening apertures 132, 134 and the oscillator cavity 140. Thus, the media openings 112, 114 communicate with each other via the cover panel cavity 162 and with the oscillator cavity 140, such that the vibronic sensor 142 can be charged, via a first gas path running through the cover panel cavity 162, with a gas that is fed or discharged through the media openings 112, 114. In order to ensure a reliable gas exchange at the location of the vibronic sensor 142, the gas analyzer furthermore has a first fluid channel 136 and a second fluid channel 138, each extending from the first and second media aperture 132, 134, respectively, to the oscillator cavity, and prepared by anisotropic etching of trenches in the sensor panel 130 from the underside 130a. The fluid channels 136, 138 form a second gas path via which the vibronic sensor 142 can be charged from the underside of the sensor panel 130 with the gas introduced into the gas analyzer. This ensures a sufficiently rapid exchange of gas in the oscillator cavity 140. On the other hand, the fluid channels 136, 138 have a considerably higher flow resistance than a gas path between the media opening apertures that runs through the cover panel cavity 162. Therefore, the majority of the gas flows from the first media opening aperture 132 to the second media opening aperture 134 through the cover panel cavity 162. Therefore, the flow velocity of the gas in the oscillator cavity 140 remains limited. Thus, the oscillator's vibration behavior is at most negligibly influenced by flows.

The cover panel 160 has a pressure sensor surface area 166; here this means that, for example, either a piezo-resistive pressure sensor membrane can be prepared in the material of the cover panel, or the cover panel comprises an opening via which a pressure sensor mounted on the cover panel can be charged with a pressure prevailing in the gas analyzer.

The cover panel 160 furthermore comprises a magnetic surface 168 on its upper side, on which magnetic surface a magnet is to be mounted or prepared. The magnetic surface is aligned with the oscillator cavity 140, such that the vibronic sensor can be excited to vibrate by means of an alternating magnetic field.

Finally, the cover panel 160 has a recess 164 in a lateral edge area in order to make contact surfaces on the upper side of the sensor panel 130 accessible.

Figure 3:
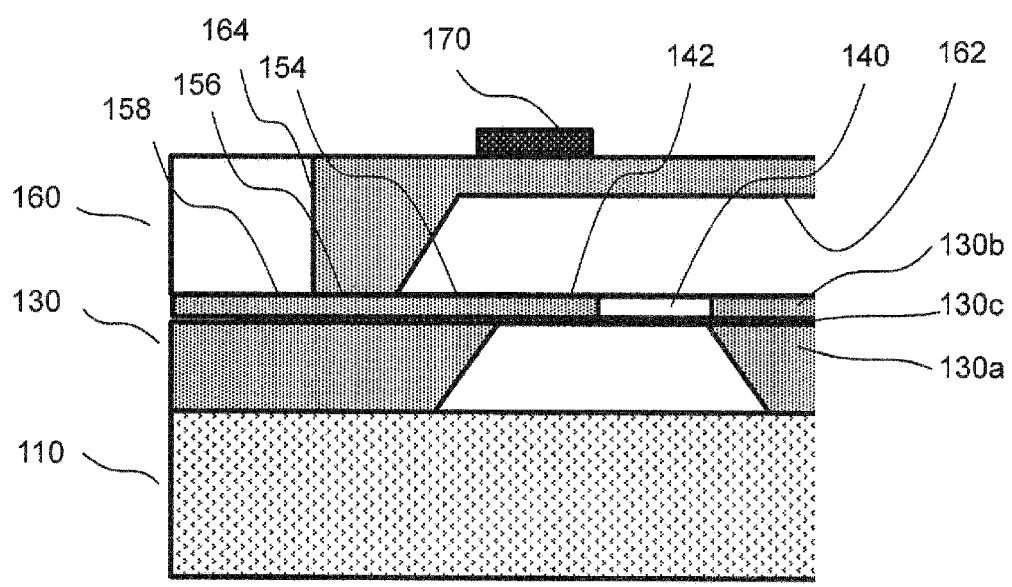
FIG. 3 shows a detailed longitudinal section through the gas analyzer according to the present disclosure.

In the following, details of the vibronic sensor 142 are explained based on FIGS. 2 and 3, which vibronic sensor 142 is prepared in the device layer at the upper side 130b of the sensor panel 130, wherein the sensor panel 130 is formed from an SOI wafer. The oscillator cavity 140 is prepared via anisotropic etching of a cavity from the underside 130a of the sensor panel 130 up to the oxide layer 130c, and then the removal of the oxide layer and the device layer in the area of the cavity except in a masked area which forms the cantilever of the vibronic sensor 142.

A conductor loop or planar coil 144 is prepared on the cantilever in order to drive the vibronic sensor 142. Insofar as only a simple conductor loop is formed, contacting can take place entirely on the upper side 130b of the sensor panel. In the event of the spiral planar coil 144 with several turns shown here, plated through-holes are formed to the rear side of the cantilever in order to be able to contact an inner end of the planar coil 144. The planar coil can be charged with an alternating current via coil contact surfaces 146, 147. The resulting magnetic field, in interaction with the static magnetic field of a permanent magnet 170 which is arranged on the cover plate 160, leads to an oscillating force that excites the cantilever to oscillate depending on the frequency. The natural frequency of the cantilever depends on the density of a gas mixture surrounding the cantilever, whereas the vibration damping of the cantilever depends on the viscosity of the gas mixture.

The vibronic sensor 142 furthermore comprises four piezo-resistive resistive elements arranged in a Wheatstone bridge for detecting the vibrations of the cantilever, wherein two resistive elements of a first type 148 are arranged at least partially on the cantilever, and two resistive elements of a second type 149 are arranged in an edge area of the device layer surrounding the oscillator cavity 140. The Wheatstone bridge is to be fed with a constant longitudinal current via contact surfaces of the first type 150, wherein the associated longitudinal voltage is a function of the temperature of the vibronic sensor. Accordingly, an associated diagonal voltage of the Wheatstone bridge that is applied to contact surfaces of the second type 152 is a measure of the deflection of the oscillating cantilever.

The aforementioned 146, 147, 150, 152 are arranged in an edge area 158 on the upper side of the sensor panel 130, which edge area 158 is not covered by the cover panel 160 since the cover panel 160 here has a recess 164. As already mentioned above, the cover panel 160 is connected to the sensor panel 130 along a circumferential joint 156 which has a glass solder, wherein the joint 156 in the area of the recess 164 separates the edge area 158 of the sensor panel with the contact surfaces from an inner area of the sensor panel 154 in which the vibronic sensor 142 is arranged. The contact surfaces are connected to the planar coil 144 or the Wheatstone bridge by metallic conductor traces, wherein the conductor traces are covered by the glass solder in the area of the joint 156.

Anisotropic etching processes were used in the preparation of the cavities in the exemplary embodiment. Of course, all other etching processes of semiconductor process technology can also be used to realize the invention.

Figure 4:
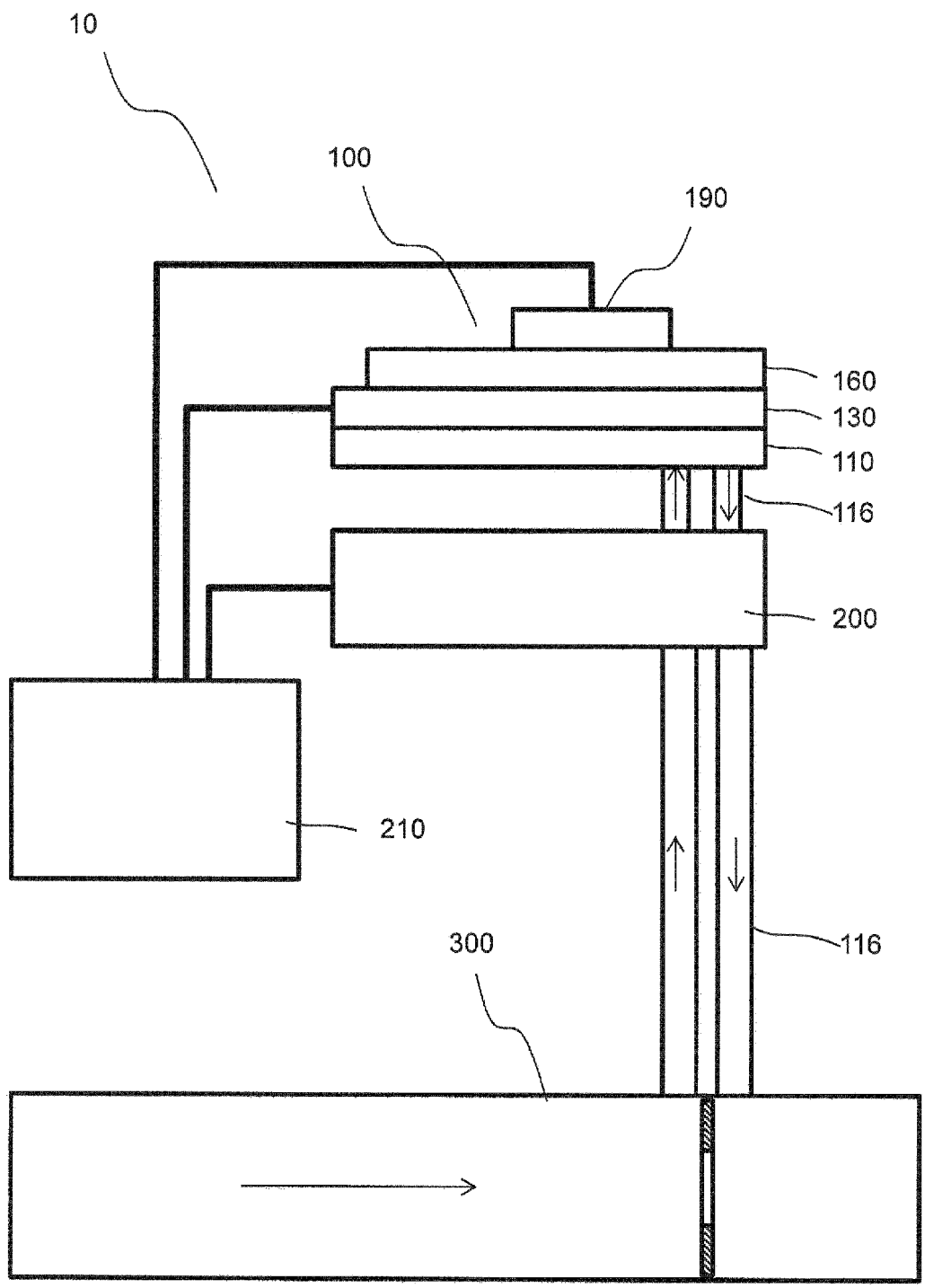
FIG. 4 shows a schematic representation of a gas analysis arrangement according to the present disclosure.

In addition to the gas analyzer 100 described above, the gas analysis arrangement shown in FIG. 4 comprises a piezo-resistive absolute pressure sensor 190 which is arranged on the cover panel 160 of the gas analyzer, and a thermal conductivity sensor 200 which is connected in parallel with the gas analyzer 100 to differential pressure lines 116, which for their part are fed with a stream of a gas mixture to be analyzed via a pressure gradient across a diaphragm in a pipeline 300. A suitable thermal conductivity sensor is offered by the company POSiFA Microsystems, for example. The gas analysis arrangement 10 furthermore comprises an operating and evaluation circuit 210 for exciting the oscillator of the gas analyzer, and for detecting the vibrations of the oscillator, and, if applicable, for driving additional sensors of the gas analysis assembly and for detecting their signals.

The invention claimed is:

1. A gas analyzer for measuring the density or viscosity of a medium, including:
   a connection panel having a first media opening and a second media opening, wherein each of the first and second media openings extends from a first surface to a second surface of the connection panel;
   a sensor panel joined together with the connection panel on a first joint plane; and
   a cover panel joined together with the sensor panel on a second joint plane on a sensor panel face facing away from the connection panel, wherein the cover panel has a cover panel cavity which communicates with the first and second media openings,
   wherein the sensor panel has at least one oscillator cavity which communicates with the first and second media openings, wherein the sensor panel has a micromechanical oscillator which is arranged in the oscillator cavity and excitable to mechanically vibrate perpendicularly to the joint planes,
   wherein the gas analyzer further includes a first fluid channel extending from the first media opening to the oscillator cavity and formed between the connection panel and the sensor panel or a second fluid channel extending from the second media opening to the oscillator cavity and formed between the connection panel and the sensor panel,
   wherein the sensor panel has a first media opening aperture extending from the first media opening to the cover panel cavity or the sensor panel has a second media opening aperture extending from the second media opening to the cover panel cavity,
   wherein the first media opening aperture has a first area centroid on an upper side of the sensor panel facing the cover panel and the second media opening aperture has a second area centroid on the upper side of the sensor panel,
   wherein the first area centroid has an area centroid clearance from the second area centroid,
   wherein the oscillator cavity has a third area centroid on the upper side of the sensor panel, and
   wherein the third area centroid has a clearance from a connecting line between the first and the second area centroids that is at least half of a geometric mean arising from the area centroid clearance and a clearance of the cover panel from the upper side of the sensor panel, averaged along the connecting line.

2. The gas analyzer of claim 1, wherein the oscillator cavity includes a first aperture through the sensor panel.

3. The gas analyzer of claim 1, wherein the cover panel cavity covers the oscillator cavity and the first media opening aperture and the second media opening aperture.

4. The gas analyzer of claim 1, wherein the first fluid channel has a depression formed in a surface of the sensor panel, wherein the first fluid channel opens into the first media opening aperture; or
   wherein the second fluid channel has a depression that is formed in the surface of the sensor panel, wherein the second fluid channel opens into the second media opening aperture.

5. The gas analyzer of claim 1, wherein the sensor panel is made by structuring an SOI wafer.

6. The gas analyzer of claim 5, wherein the micromechanical oscillator comprises amorphous silicon deposited on an insulator layer of the SOI wafer.

7. The gas analyzer of claim 1, wherein the micromechanical oscillator has a resistive converter with at least one resistive element having a resistance value that is dependent on deformation.

8. The gas analyzer of claim 1, wherein the micromechanical oscillator has at least one conductor loop to generate a first magnetic field;
   wherein the gas analyzer has a field source for a second magnetic field; and
   wherein the first magnetic field and the second magnetic field have at least one component that runs parallel to a surface normal of the sensor panel.

9. The gas analyzer of claim 1, wherein the cover panel comprises Si and the connection panel comprises glass.

10. A gas analysis arrangement, including:
    a gas analyzer, including:
        a connection panel having a first media opening and a second media opening, wherein each of the first and second media openings extends from a first surface to a second surface of the connection panel;
        a sensor panel joined together with the connection panel on a first joint plane; and
        a cover panel joined together with the sensor panel on a second joint plane on a sensor panel face facing away from the connection panel, wherein the cover panel has a cover panel cavity which communicates with the first and second media openings, wherein the sensor panel has at least one oscillator cavity which communicates with the first and second media openings, wherein the sensor panel has a micromechanical oscillator which is arranged in the oscillator cavity and excitable to mechanically vibrate perpendicularly to the joint planes, wherein the gas analyzer further includes a first fluid channel extending from the first media opening to the oscillator cavity and formed between the connection panel and the sensor panel or a second fluid channel extending from the second media opening to the oscillator cavity and formed between the connection panel and the sensor panel, wherein the sensor panel has a first media opening aperture extending from the first media opening to the cover panel cavity or the sensor panel has a second media opening aperture extending from the second media opening to the cover panel cavity, wherein the first media opening aperture has a first area centroid on an upper side of the sensor panel facing the cover panel and the second media opening aperture has a second area centroid on the upper side of the sensor panel, wherein the first area centroid has an area centroid clearance from the second area centroid, wherein the oscillator cavity has a third area centroid on the upper side of the sensor panel, and wherein the third area centroid has a clearance from a connecting line between the first and the second area centroids that is at least half of a geometric mean arising from the area centroid clearance and a clearance of the cover panel from the upper side of the sensor panel, averaged along the connecting line; and a temperature sensor, or a pressure sensor, or a thermal conductivity sensor.

11. The gas analysis arrangement of claim 10, further including an operating and evaluation circuit for exciting the micromechanical oscillator, detecting vibrations of the micromechanical oscillator, driving at least one of the temperature sensor, pressure sensor, and thermal conductivity sensor, and detecting signals of the at least one of the temperature sensor, pressure sensor, and thermal conductivity sensor.

12. A gas analyzer for measuring the density or viscosity of a medium, including:

a connection panel having a first media opening and a second media opening, wherein each of the first and second media openings extends from a first surface to a second surface of the connection panel;

a sensor panel joined together with the connection panel on a first joint plane; and a cover panel joined together with the sensor panel on a second joint plane on a sensor panel face facing away from the connection panel, wherein the cover panel has a cover panel cavity which communicates with the first and second media openings;

wherein the sensor panel has at least one oscillator cavity which communicates with the first and second media openings, wherein the sensor panel has a micromechanical oscillator which is arranged in the oscillator cavity and excitable to mechanically vibrate perpendicularly to the joint planes, wherein the gas analyzer further includes a first fluid channel extending from the first media opening to the oscillator cavity and formed between the connection panel and the sensor panel or a second fluid channel extending from the second media opening to the oscillator cavity and formed between the connection panel and the sensor panel, wherein the sensor panel has a first media opening aperture extending from the first media opening to the cover panel cavity or the sensor panel has a second media opening aperture extending from the second media opening to the cover panel cavity, and wherein the first and second media opening apertures, the oscillator cavity, and the cover panel cavity are positioned and matched to one another such that an average flow velocity of a gas in the oscillator cavity is not more than one-quarter of the average flow velocity in the first and second media opening apertures.

* * * * *